United States Patent
Kokott et al.

(10) Patent No.: US 9,086,107 B2
(45) Date of Patent: Jul. 21, 2015

(54) INTERNALLY VENTILATED BRAKE DISC

(75) Inventors: Kordian Kokott, Munich (DE); Tabea Nillert, Heidesee (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 551 days.

(21) Appl. No.: 13/179,141

(22) Filed: Jul. 8, 2011

(65) Prior Publication Data

US 2011/0259684 A1    Oct. 27, 2011

Related U.S. Application Data

(63) Continuation of application No. PCT/EP2010/000070, filed on Jan. 9, 2010.

(30) Foreign Application Priority Data

Feb. 27, 2009 (DE) .......................... 10 2009 010 973

(51) Int. Cl.
  *F16D 65/12* (2006.01)
  *F16D 65/847* (2006.01)
  (Continued)

(52) U.S. Cl.
  CPC ............ *F16D 65/128* (2013.01); *F16D 65/847* (2013.01); *F16D 2065/1328* (2013.01); *F16D 2065/788* (2013.01); *Y10T 29/49826* (2015.01)

(58) Field of Classification Search
  CPC .......... F16D 65/128; F16D 2065/1328; F16D 2065/1332
  USPC .... 188/18 A, 218 XL, 218 R, 264 A, 264 AA
  See application file for complete search history.

(56) References Cited

U.S. PATENT DOCUMENTS 212,217 A * 2/1879 Grier ................................ 267/40
2,659,460 A * 11/1953 Lyon ......................... 188/264 R
(Continued)

FOREIGN PATENT DOCUMENTS

DE        1 555 186          7/1970
DE        24 59 859 A1       6/1976
(Continued)

OTHER PUBLICATIONS

German Search Report dated Apr. 8, 2011 including partial English-language translation (Nine (9) pages).
(Continued)

*Primary Examiner* — Robert A Siconolfi
*Assistant Examiner* — Mahbubur Rashid
(74) *Attorney, Agent, or Firm* — Crowell & Moring LLP

(57) ABSTRACT

An internally ventilated brake disc includes at least two friction rings, which are held apart from each other by ribs, and air blades, which are fastened to the brake disc and which extend essentially from the inner circumference of a friction ring in the radial direction by a defined amount in the direction of the axis of rotation of the brake disc. The air blades function to deliver a cooling air flow through the space between the friction rings when the brake disc is rotating. The air blades are formed by one or more sheet metal part(s) that is or are connected to at least some of the ribs. This connection can be by material bonding or can be shape locking or force locking. The air blades are machined out of a sheet metal ring and, thus, form an integral sheet metal part, wherein the sheet metal ring is provided with a plurality of clamps or clips for a shape-locking connection to the ribs and is not formed so as to be closed.

6 Claims, 1 Drawing Sheet

(51) Int. Cl.
*F16D 65/02* (2006.01)
*F16D 65/78* (2006.01)

(56) References Cited

U.S. PATENT DOCUMENTS

| | | | | |
|---|---|---|---|---|
| 2,769,512 | A * | 11/1956 | Tack | 188/218 XL |
| 2,979,168 | A * | 4/1961 | Lyon | 188/264 R |
| 3,142,364 | A * | 7/1964 | Mikkelson | 188/264 R |
| 4,013,146 | A | 3/1977 | Gebhardt et al. | |
| 4,501,346 | A * | 2/1985 | Bogenschutz | 188/218 XL |
| 4,621,715 | A * | 11/1986 | Denton | 188/264 R |
| 4,830,150 | A * | 5/1989 | Denton | 188/218 R |
| 5,279,396 | A * | 1/1994 | Estaque et al. | 188/264 A |
| 5,964,323 | A * | 10/1999 | Henry | 188/264 R |
| 6,035,978 | A * | 3/2000 | Metzen et al. | 188/218 XL |
| 6,260,669 | B1 * | 7/2001 | Daudi | 188/71.6 |
| 6,536,564 | B1 | 3/2003 | Garfinkel et al. | |
| 7,219,777 | B2 * | 5/2007 | Lin | 188/218 XL |
| 7,380,645 | B1 | 6/2008 | Ruiz | |
| 2005/0098398 | A1 * | 5/2005 | Miles | 188/218 XL |
| 2007/0045066 | A1 * | 3/2007 | Sadanowicz et al. | 188/218 XL |
| 2008/0017460 | A1 | 1/2008 | Prahst | |
| 2009/0314591 | A1 * | 12/2009 | Suppiah | 188/218 XL |
| 2010/0175955 | A1 * | 7/2010 | Holzschuh et al. | 188/218 XL |
| 2011/0240422 | A1 * | 10/2011 | Lathwesen | 188/218 XL |

FOREIGN PATENT DOCUMENTS

| | | |
|---|---|---|
| DE | 25 57 649 A1 | 6/1977 |
| DE | 196 52 464 A1 | 6/1998 |
| DE | 10 2005 033 352 A1 | 1/2007 |
| DE | 10 2006 033 772 A1 | 1/2008 |
| DE | 10 2008 016 037 A1 | 11/2008 |
| DE | 10 2008 054 397 A1 | 6/2010 |
| DE | 102008054397 A1 * | 6/2010 |
| EP | 849485 A2 * | 6/1998 |
| JP | 56094036 A * | 7/1981 |

OTHER PUBLICATIONS

International Search Report dated Mar. 29, 2010 including English-language translation (Six (6) pages).

* cited by examiner

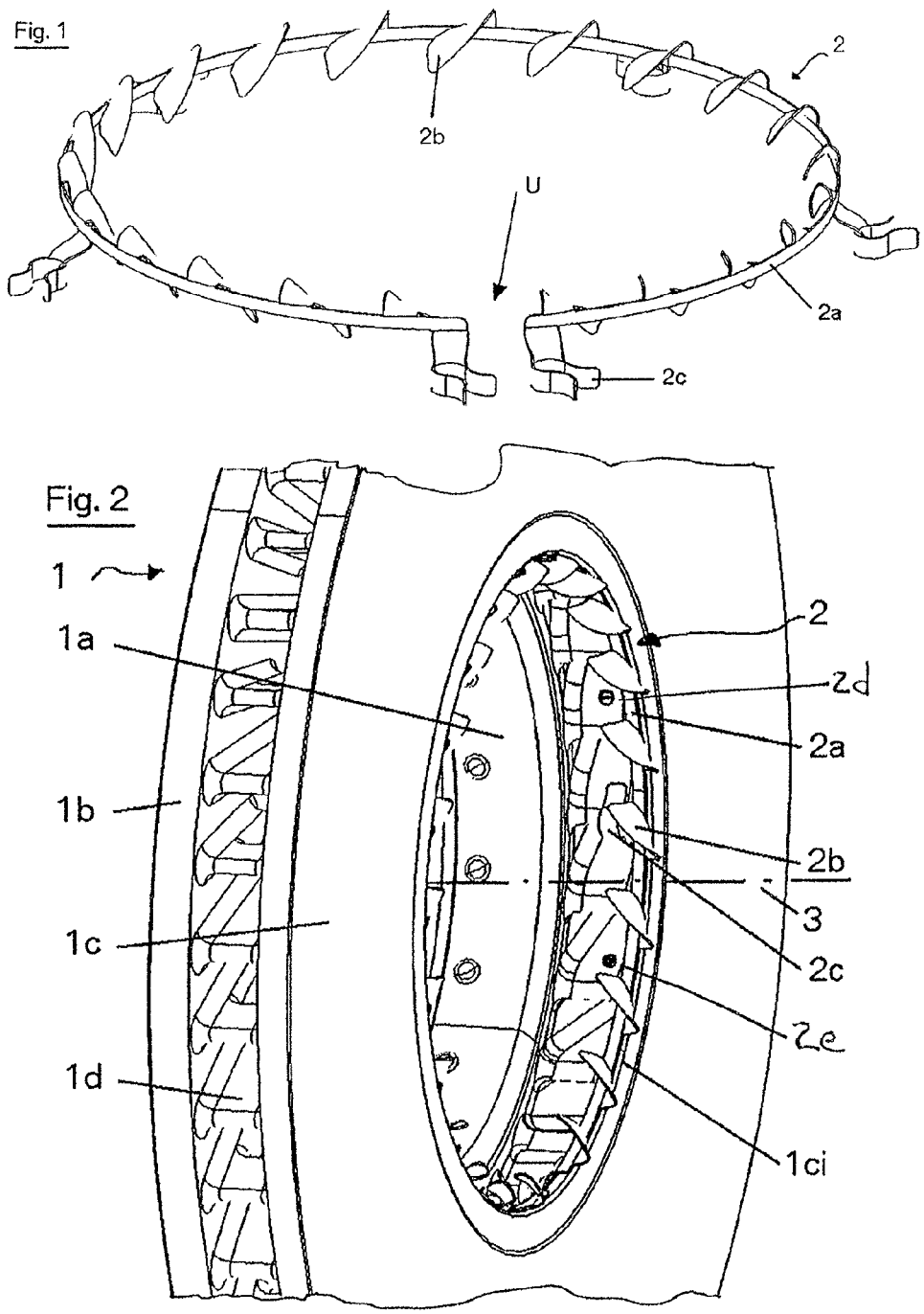

INTERNALLY VENTILATED BRAKE DISC

CROSS-REFERENCE TO RELATED APPLICATIONS

This application is a continuation of PCT International Application No. PCT/EP2010/000070, filed Jan. 9, 2010, which claims priority under 35U.S.C. §119 from German Patent Application No. DE 10 2009 010 973.0, filed Feb. 27, 2009, the entire disclosures of which are herein expressly incorporated by reference.

BACKGROUND AND SUMMARY OF THE INVENTION

The invention relates to an internally ventilated brake disc having at least two friction rings, which are held apart from each other by ribs, and including air blades, which are fastened to the brake disc and which extend essentially from the inner circumference of a friction ring in the radial direction by a defined amount in the direction of the axis of rotation of the brake disc, in order to deliver a cooling air flow through the space between the friction rings, when the brake disc is rotating. With respect to the prior art, reference is made not only to DE-OS 15 55 186 and DE 196 52 464 A1, but also to DE 10 2008 016 037 A1.

An effective cooling of brake discs, which are installed, for example, in motor vehicles, can be very important. For this reason, attempts known to the person skilled in the art have been made to deliver an adequate (cooling) air flow, which is drawn in from the surroundings, into the space between the internally ventilated brake discs. In simpler cases the ribs, which are provided between the (two) friction rings of an internally ventilated brake disc, bring about this transport of the air flow. In this respect it is known to provide a protective cover, which is provided apart from or, more specifically, on one side of the brake disc, with suitable air conducting devices that are supposed to guarantee an adequate cooling air flow. Whereas the air conducting devices in these known protective covers do not move relative to the vehicle even when the brake disc is rotating, there also exist brake discs with air conducting blades or air blades that are fastened to the brake discs. When the brake disc rotates, these air blades move, naturally together with the brake disc, relative to the vehicle, that is, they rotate about the rotational axis of the brake disc. Of course, such rotating air blades can deliver a cooling air flow in an especially effective way and, if suitably configured, in particular, also into the space between the two friction rings of an internally ventilated brake disc.

DE 10 2008 016 037 A1, mentioned above, shows a brake disc with air blades, which are arranged on the brake disc in this way. These air blades are formed by suitably elongated ribs that extend, when viewed in the radial direction, beyond the friction rings over a defined distance in the direction of the rotational axis of the brake disc and, in so doing, are suitably formed. For example, these ribs can be inclined relative to the surface of the friction ring and, as a result, are aligned relative to this surface so as not to be perpendicular; or the continuations of the ribs that extend beyond the friction rings can extend in a suitably curved manner.

However, the casting process for manufacturing such specially formed ribs and, therefore, the casting process for manufacturing such a brake disc in its entirety is relatively time-consuming and costly.

There is therefore needed a brake disc that is simplified in comparison to the prior art.

This and other needs are met by an internally ventilated brake disc comprising at least two friction rings, which are held apart from each other by ribs, and comprising air blades, which are fastened to the brake disc and which extend essentially from the inner circumference of a friction ring in the radial direction by a defined amount in the direction of the axis of rotation of the brake disc, in order to deliver a cooling air flow through the space between the friction rings when the brake disc is rotating. The air blades are formed by a sheet metal part, or a plurality of sheet metal parts, that is or are connected to at least some of the ribs.

If the air blades are formed, as proposed, by an initially independent sheet metal part, then the manufacture of especially complex and formed air blades is significantly simplified over the closest prior art. Such an approach simplifies the manufacture of even complex shapes that in terms of function are designed, or rather can be designed, in the best possible way, that is, to deliver an air flow. Even though it is possible for each individual air blade to be formed by an independent sheet metal part, it is simpler from a manufacturing viewpoint, especially with respect to the fastening of the air blades to the brake disc, to combine a plurality of air blades to form one sheet metal part. This fastening can best be done on the ribs between the friction rings without impairing the friction rings. At the same time not every one of these ribs has to be used explicitly to fasten the air blade sheet metal part(s). Rather, it may be adequate enough to provide a fastening on just some ribs, especially if the air blades are machined out of a sheet metal ring and form an integral sheet metal part.

With respect to the fastening of the air blade sheet metal part(s) to the ribs of the brake disc, a very wide range of connecting techniques may be considered. For example, the air blade sheet metal parts can be connected by material bonding to the ribs and particularly, in so doing, may be integrally cast. However, it is also possible to connect the air blade sheet metal part in a shape-locking manner to one or more ribs, for example, by "clipping on" using flexible clamps. This is preferably performed with a sheet metal ring, which supports the air blades and with respect to a simple attachment to the brake disc is not closed, but rather open. That is, the sheet metal ring is configured so as to be interrupted and, hence, at least slightly flexible. Finally, it is possible to connect the air blade sheet metal part(s) in a force-locking manner to the ribs, for example, by riveting or screwing on.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a perspective illustration of an air blade sheet metal part in the form of a sheet metal ring according to an exemplary embodiment of the invention; and FIG. 2 is a partial perspective view of an internally ventilated brake disc to which the air blade sheet metal part of FIG. 1 is fastened.

DETAILED DESCRIPTION OF THE DRAWINGS

The two accompanying figures show an exemplary embodiment of the present invention in a three dimensional view in each case. In particular, FIG. 1 shows an air blade sheet metal part 2 in the form of a sheet metal ring 2a that, according to FIG. 2, can be fastened or is fastened to an internally ventilated brake disc 1.

The reference numeral 1 identifies an internally ventilated brake disc in its entirety. This brake disc is intended for use in a passenger motor vehicle and, in principle, is constructed in the conventional way for such use. In addition to a so-called brake disc chamber 1a, by which the brake disc can be fastened to the respective wheel carrier or the like, the brake disc has two friction rings 1b, 1c. The friction rings 1b, 1c are held apart from each other and are connected to each other by way of ribs id. In this respect the friction ring 1b, which lies externally when the brake disc is installed in the vehicle, is connected to the brake disc chamber 1a, whereas the other friction ring 1c, which then lies internally, is supported by the outer lying friction ring 1b by means of the ribs 1d (see FIG. 2). The rotational axis of this brake disc is marked with the reference numeral 3, whereas the wall of the inner lying friction ring 1c that faces this axis of rotation 3 is marked as the inner circumference 1ci.

Furthermore, there is a so-called air blade sheet metal part 2 (see FIG. 1), which is formed by a sheet metal ring 2a, which is open in the area marked by an arrow "U" and has a plurality of air blades 2b that are in essence uniformly distributed over the circumference. These air blades 2b extend, when view in the radial direction, inwardly over a defined distance in the direction of the center point of the sheet metal ring 2a. Furthermore, a plurality of clamps 2c are formed on this sheet metal ring 2a by way of feet. These clamps extend outwardly in the radial direction, that is, away from the center point of the sheet metal ring 2a.

The air blade sheet metal part 2 can be manufactured by means of known forming techniques. FIG. 2 shows that the air blade sheet metal part 2 is fastened by use of the clamps 2c to the ends of some of the ribs 1d. These ends are situated "inwardly" with respect to the rotational axis 3 of the brake disc 1. In this case the fastening is performed by pushing the clamps 2c onto the rib ends, so that the sheet metal ring 2a comes to rest essentially against the inner circumference 1ci of the friction ring 1c. This affixing can be easily performed in the central cavity, which is defined by the two friction rings 1b, 1c (and by the inner circumference 1ci of the latter), because the sheet metal ring 2a of the air blade sheet metal part is, as described, open and slightly flexible, that is, deformable within limits. Alternatively, the sheet metal ring 2a may be connected to brake ribs ends by fasteners such as screws 2d and/or rivets 2e. In the assembled state on the brake disc 1, the center point of the sheet metal ring aligns essentially with the rotational axis 3 of the brake disc 1.

In the installed state of the air blade sheet metal part 2 (according to FIG. 2), the air blades 2b, formed on the sheet metal ring 2a, preferably by being machined out of the sheet metal ring to be part of an integral sheet metal part, are positioned in such a way that they deliver an air flow into or through the space between the two friction rings 1b, 1c when the brake disc 1 is rotating. To this end, the air blades 2b extend from the sheet metal ring 2a, resting against the inner circumference 1ci of the friction ring 1c, by a defined amount in the radial direction relative to the rotational axis 3 of the brake disc 1. In the present embodiment, these air blades 2b project on one side, that is, when seen in the direction of the rotational axis 3 of the brake disc 1, beyond the friction ring 1c (and, thus, the inner friction ring when the brake disc 1 is installed in the vehicle), which is not fastened directly to the brake disc chamber 1a. At this point it must be explicitly pointed out that it is quite possible to design a plurality of details at variance with the above explanations without departing from the essence of the patent claims. In particular, the so-called air blade sheet metal part 2 does not have to be made of a metal plate, but rather it is also possible to design it, for example, in plastic (and then preferably as an injection molded part).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An internally ventilated brake disc, comprising:
   at least two friction rings;
   a disc hub portion configured to support the at least two friction rings on a vehicle axle hub;
   a plurality of ribs arranged between and spacing apart the two friction rings, the plurality of ribs not extending radially inward toward an axis of rotation of the brake disc beyond an inner circumference of each of the two friction rings;
   a plurality of air blades separate from the at least two friction rings and the disc hub portion and fastened to the brake disc, the plurality of air blades extending essentially inwardly in a radial direction from the inner circumference of at least one of the two friction rings toward the axis of rotation of the brake disc, the plurality of air blades being operatively configured to deliver cooling air through a space between the two friction rings during rotation of the brake disc;
   wherein the plurality of air blades are formed as a sheet metal part coupled to one or more of the plurality of ribs,
   wherein the air blades of the sheet metal part are formed out of a sheet metal ring, whereby the sheet metal part having the air blades is an integral sheet metal part, and
   wherein the sheet metal ring is not a closed ring, and comprises a plurality of clamps extending radially outward from the sheet metal ring and configured for a shape-locking connection to the one or more ribs.

2. The internally ventilated brake disc according to claim 1, wherein the sheet metal part having the air blades is materially bonded to the one or more ribs.

3. The internally ventilated brake disc according to claim 1, wherein the sheet metal part having the air blades is integrally cast to the one or more ribs.

4. The internally ventilated brake disc according to claim 1, wherein the sheet metal part having the air blades is shape-lockingly connected to the one or more ribs.

5. The internally ventilated brake disc according to claim 1, wherein the sheet metal part having the air blades is force-lockingly connected to the one or more ribs.

6. The internally ventilated brake disc according to claim 5, wherein the force-locking connection is one of a rivet and screw connection.

* * * * *